M. CLARK.
ANTISKIDDING VEHICLE WHEEL.
APPLICATION FILED OCT. 11, 1909.
985,884.
Patented Mar. 7, 1911.
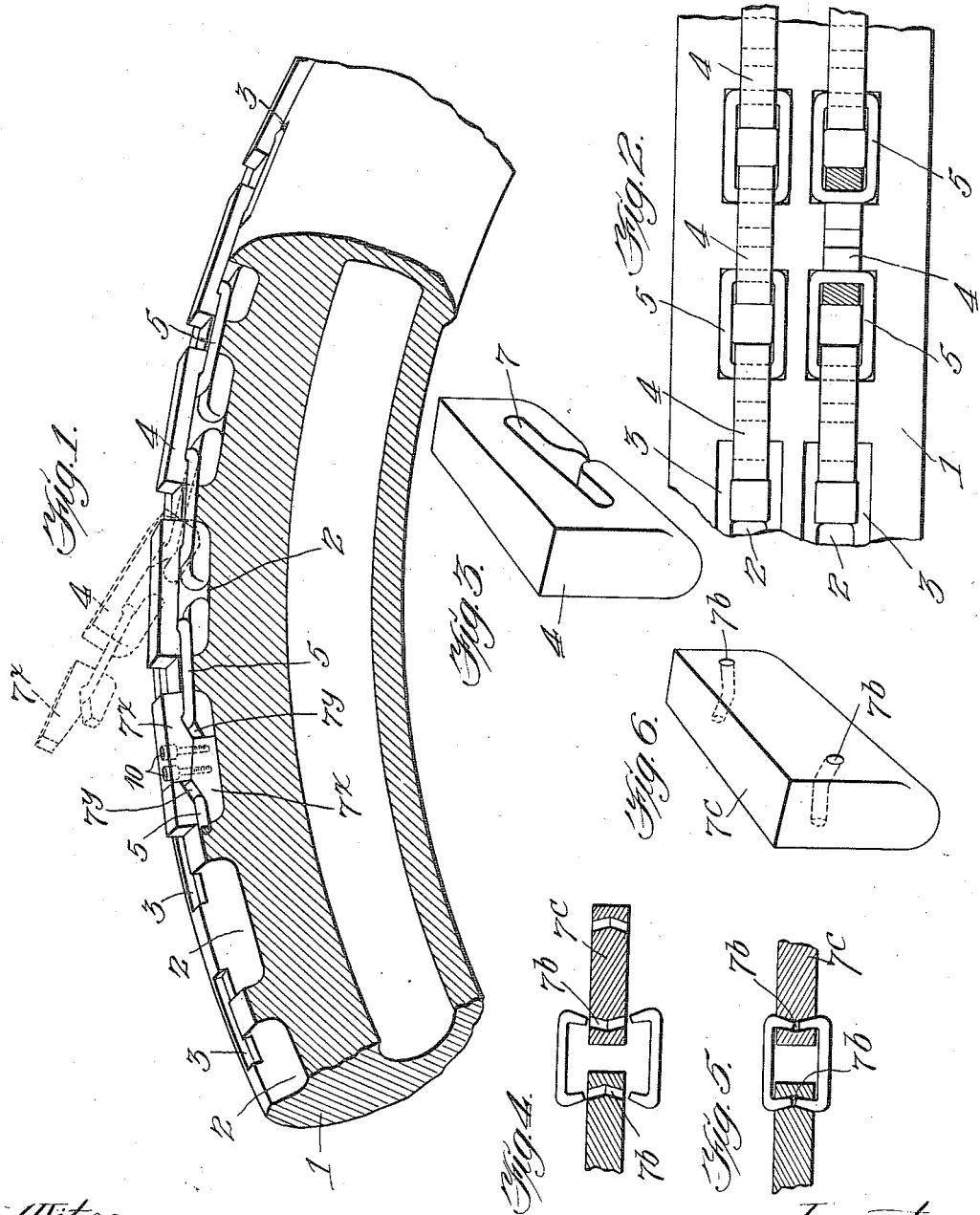

UNITED STATES PATENT OFFICE.

MELVILLE CLARK, OF CHICAGO, ILLINOIS.

ANTISKIDDING VEHICLE-WHEEL.

985,884.      Specification of Letters Patent.      Patented Mar. 7, 1911.

Application filed October 11, 1909. Serial No. 522,091.

*To all whom it may concern:*

Be it known that I, MELVILLE CLARK, a citizen of the United States, residing at Chicago, in the county of Cook and State of Illinois, have invented new and useful Improvements in Antiskidding Vehicle-Wheels, of which the following is a specification, reference being had to the accompanying drawings, forming a part thereof.

The purpose of this invention is to provide an improved construction of vehicle wheels or tires for the same adapted to prevent side-slipping or skidding to which motor-driven vehicles are liable on smooth or slippery pavements and soft roads.

It consists in the elements and features of construction shown and described as indicated in the claims.

In the drawings:—Figure 1 is a partly sectional side elevation of a portion of a vehicle wheel tire provided with one form of this invention, section being made in plane transverse to the axis of the wheel. Fig. 2 is a plan view of the same. Fig. 3 is a perspective view of one of the link blocks. Fig. 4 shows a modified form of the device and is a section through two blocks and the connecting link at the plane of their pivotal connection, showing such blocks and links disassembled and positioned for illustrating the manner of assembling. Fig. 5 is a view similar to Fig. 4 showing the parts fully assembled. Fig. 6 is a perspective view of the block of the modified form represented in Figs. 4 and 5 on a larger scale than said figures.

The drawings represent in a conventional way two pieces of an automobile wheel tire of ordinary construction, which comprises a comparatively thick and heavy solid rubber tread portion, 1, which is to be armored by the anti-skidding device constituting this invention, and which for that purpose is formed with a peripheral series of pockets, 2, which are connected successively by shallower pockets, 3, the pockets, 2, being adapted for the lodgment therein of blocks, 4, of the anti-skidding device, and the pockets, 3, for the lodgment of the links, 5, which connect consecutive blocks, 4. The blocks, 4, are designed to be of metal, having their inner or bottom corners and edges rounded, as seen in Fig. 3, the pockets, 2, being similarly shaped to seat the blocks, the outer edges and corners of the blocks being preferably angular for more positive engagement with the pavement to prevent slipping. The consecutive blocks, 4, are connected by links, 5, which are pivotally engaged with the blocks, 4, so as to make a chain which may extend around the entire periphery of the wheel, the blocks, 4, being lodged in the pockets, 2, and the connecting links, 5, being lodged in the pockets, 3. For connecting the blocks, 4, and links, 5, to make such continuous chain in the form shown in Figs. 1, 2 and 3, the blocks have a T-shaped aperture, 7, the portion corresponding to the stem of the T opening at the middle point of the inner side edge of the block, and the portion corresponding to the cross of the T extending longitudinally of the block, said aperture extending at all parts of the T form entirely through the block from side to side, its width being such as to admit freely the cross bar of the links, 5, which are entered one at a time through the T portion of the aperture, one link being drawn to one end and the other to the other end of the portion of the aperture corresponding to the cross of the T. A continuous chain may thus be assembled made up of the blocks, 4, alternating with the links, 5, each of the latter being a completely closed link and thereby affording the maximum strength which can be afforded by the amount of the material in such link. When this construction is employed, the chain will be adapted for being connected endless about the wheel tire by having one of the block links of special form consisting of two parts, $7^x$, each of which is L-shaped and has a transverse slot or notch, $7^y$, leading from the interior angle of the L, obliquely toward the proximate end of the piece, the two pieces being adapted to be lapped and matched together and forming when thus matched a block of the same size as the other block, 7, and being secured together by bolts, 10, taking through the two lapped members, the links, 5, being entered in the slots, $7^y$, before the two members are thus lapped and secured together. The two members, $7^x$, it will be understood, will form the opposite ends of the chain before it is connected up endless by thus lapping and securing said two members to each other.

In the form shown in Figs. 4 and 5, instead of employing the closed links, 5, the blocks are connected by two-part links, each approximately C-shaped or of double-angular form, and adapted to be entered from opposite sides into the apertures, $7^b$, in the blocks, 7ᶜ. In order to adapt the links in this form to resist spreading of their ends engaged with the consecutive blocks, they are preferably made as shown with said ends slightly inturned so as to converge slightly and form acute angles with the cross bar. The apertures, 7ᵇ, in the block, 7ᶜ, are formed extending at a correspondingly oblique angle inward from the opposite surface of the block, and are further somewhat enlarged at their meeting point, so as to allow for the pivotal action of the links in the blocks in applying and removing the chain from the wheel. These C-shaped link members may be engaged with the blocks in a manner which may be understood from Figs. 4 and 5; that is to say, both C-shaped members of the link must be introduced simultaneously from opposite sides into both the blocks, 7ᶜ, which they connect. When the chain thus assembled is lodged in the tire, the escape of the C-shaped link members is effectually prevented not only by the fact that they lie in the pockets, 3, but by the further fact that the circumferential stress of the work operating on the obliquely inturned ends of the link members makes it impossible for them to spread, because such spreading must be accompanied by drawing together of the blocks, 7ᶜ.

I claim:—

1. A vehicle wheel tire comprising a tread member which has a peripheral channel consisting of a succesion of deep pockets having rounded corners, and shallower pockets alternating with and connecting the deep pockets, in combination with an anti-skidding device consisting of a chain made up of blocks lodged in the deep pockets and having correspondingly rounded corners to fit the same, alternating with and connected by links which comprise two side bars which lap the adjacent ends of the blocks at opposite sides thereof, and cross bars which extend into the blocks and constitute the pivots of the links to the blocks, said link side bars being lodged in said shallower pockets.

2. An anti-skidding armor for a wheel tire consisting of exteriorly angular blocks and links which alternate with them and pivotally connect them, said links each consisting of two-parts, each C-shaped, with the ends converging, the blocks having correspondingly trending apertures for engagement of said converging ends.

In testimony whereof, I have hereunto set my hand at Chicago, Illinois, this 7th day of October, 1909.

MELVILLE CLARK.

Witnesses:
L. H. BALDWIN,
M. G. ADY.